(12) United States Patent
Doi et al.

(10) Patent No.: US 8,462,369 B2
(45) Date of Patent: *Jun. 11, 2013

(54) HYBRID IMAGE PROCESSING SYSTEM FOR A SINGLE FIELD OF VIEW HAVING A PLURALITY OF INSPECTION THREADS

(75) Inventors: Munehiro Doi, Yasu (JP); Moon J. Kim, Wappingers Falls, NY (US); Yumi Mori, Yamato (JP); James R. Moulic, Poughkeepsie, NY (US); Hiroki Nakano, Shiga (JP)

(73) Assignee: International Business Machines Corporation, Armonk, NY (US)

( * ) Notice: Subject to any disclaimer, the term of this patent is extended or adjusted under 35 U.S.C. 154(b) by 690 days.

This patent is subject to a terminal disclaimer.

(21) Appl. No.: 11/767,728

(22) Filed: Jun. 25, 2007

(65) Prior Publication Data
US 2008/0259086 A1    Oct. 23, 2008

Related U.S. Application Data

(63) Continuation-in-part of application No. 11/738,723, filed on Apr. 23, 2007.

(51) Int. Cl.
*G06F 15/80* (2006.01)
(52) U.S. Cl.
USPC ............ 358/1.15; 358/1.13; 345/502
(58) Field of Classification Search
USPC ............... 358/1.15, 1.13; 345/502
See application file for complete search history.

(56) References Cited

U.S. PATENT DOCUMENTS

| 4,517,593 | A | 5/1985 | Keller et al. |
|---|---|---|---|
| 4,893,188 | A | 1/1990 | Murakami et al. |
| 5,136,662 | A | 8/1992 | Maruyama et al. |
| 5,506,999 | A | 4/1996 | Skillman et al. |
| 5,621,811 | A | 4/1997 | Roder et al. |
| 5,659,630 | A | 8/1997 | Forslund |
| 5,721,883 | A | 2/1998 | Katsuo et al. |
| 5,809,078 | A | 9/1998 | Tani et al. |
| 5,956,081 | A | 9/1999 | Katz et al. |
| 6,023,637 | A | 2/2000 | Liu et al. |

(Continued)

FOREIGN PATENT DOCUMENTS

| EP | 1345120 A2 | 9/2003 |
|---|---|---|
| JP | 05233570 A | 9/1993 |

(Continued)

OTHER PUBLICATIONS

Kim et al., U.S. Appl. No. 11/940,470, Office Action Communication, Jun. 9, 2010, 26 pages.

(Continued)

*Primary Examiner* — Qian Yang
(74) *Attorney, Agent, or Firm* — William E. Schiesser; Hoffman Warnick LLC (57) ABSTRACT

The present invention provides a hybrid image processing system, which generally includes an image processing unit for receiving image data corresponding to a set of images, generating commands for processing the image data, and sending the images and the commands to an image processing unit of the hybrid image processing system. Upon receipt, the image processing unit will recognize and interpret the commands, assign and/or schedule tasks for processing the image data to a set of (e.g., special) processing engines based on the commands, and return results and/or processed image data to the image interface unit.

26 Claims, 6 Drawing Sheets

U.S. PATENT DOCUMENTS

| | | | |
|---|---|---|---|
| 6,025,854 A | 2/2000 | Hinz et al. | |
| 6,081,659 A | 6/2000 | Garza et al. | |
| 6,166,373 A | 12/2000 | Mao | |
| 6,215,898 B1 | 4/2001 | Woodfill et al. | |
| 6,404,902 B1 | 6/2002 | Takano et al. | |
| 6,456,737 B1 | 9/2002 | Woodfill et al. | |
| 6,487,619 B1 | 11/2002 | Takagi | |
| 6,549,992 B1 | 4/2003 | Armangau et al. | |
| 6,567,622 B2 | 5/2003 | Phillips | |
| 6,647,415 B1 | 11/2003 | Olarig et al. | |
| 6,661,931 B1 | 12/2003 | Kawada | |
| 6,671,397 B1 * | 12/2003 | Mahon et al. | 382/145 |
| 6,744,931 B2 | 6/2004 | Komiya et al. | |
| 6,825,943 B1 * | 11/2004 | Barry et al. | 358/1.15 |
| 6,829,378 B2 | 12/2004 | DiFilippo et al. | |
| 6,898,634 B2 | 5/2005 | Collins et al. | |
| 6,898,670 B2 | 5/2005 | Nahum | |
| 6,950,394 B1 | 9/2005 | Chou et al. | |
| 6,978,894 B2 | 12/2005 | Mundt | |
| 6,987,894 B2 * | 1/2006 | Sasaki et al. | 382/304 |
| 7,000,145 B2 | 2/2006 | Werner et al. | |
| 7,016,996 B1 | 3/2006 | Schober | |
| 7,043,745 B2 | 5/2006 | Nygren et al. | |
| 7,065,618 B1 | 6/2006 | Ghemawat et al. | |
| 7,076,569 B1 | 7/2006 | Bailey et al. | |
| 7,095,882 B2 | 8/2006 | Akahori | |
| 7,102,777 B2 | 9/2006 | Haraguchi | |
| 7,106,895 B1 | 9/2006 | Goldberg et al. | |
| 7,142,725 B2 | 11/2006 | Komiya et al. | |
| 7,171,036 B1 | 1/2007 | Liu et al. | |
| 7,225,324 B2 | 5/2007 | Huppenthal et al. | |
| 7,243,116 B2 | 7/2007 | Suzuki et al. | |
| 7,299,322 B2 | 11/2007 | Hosouchi et al. | |
| 7,327,889 B1 | 2/2008 | Imai et al. | |
| 7,430,622 B1 | 9/2008 | Owen | |
| 7,480,441 B2 | 1/2009 | Klausberger et al. | |
| 7,523,148 B2 | 4/2009 | Suzuki et al. | |
| 7,602,394 B2 | 10/2009 | Seki et al. | |
| 7,605,818 B2 | 10/2009 | Nagao et al. | |
| 7,743,087 B1 | 6/2010 | Anderson et al. | |
| 7,801,895 B2 | 9/2010 | Hepper et al. | |
| 8,052,272 B2 | 11/2011 | Smith et al. | |
| 8,078,837 B2 | 12/2011 | Kajihara | |
| 8,086,660 B2 | 12/2011 | Smith | |
| 8,094,157 B1 | 1/2012 | Le Grand | |
| 2002/0002636 A1 | 1/2002 | Vange et al. | |
| 2002/0129216 A1 | 9/2002 | Collins | |
| 2002/0164059 A1 | 11/2002 | DiFilippo et al. | |
| 2002/0198371 A1 | 12/2002 | Wang | |
| 2003/0031355 A1 | 2/2003 | Nagatsuka | |
| 2003/0053118 A1 * | 3/2003 | Muramoto et al. | 358/1.15 |
| 2003/0092980 A1 | 5/2003 | Nitz | |
| 2003/0113034 A1 | 6/2003 | Komiya et al. | |
| 2004/0024810 A1 | 2/2004 | Choubey et al. | |
| 2004/0062265 A1 | 4/2004 | Poledna | |
| 2004/0062454 A1 | 4/2004 | Komiya et al. | |
| 2004/0091243 A1 | 5/2004 | Theriault et al. | |
| 2004/0122790 A1 | 6/2004 | Walker et al. | |
| 2004/0143631 A1 | 7/2004 | Banerjee et al. | |
| 2004/0153751 A1 | 8/2004 | Marshall et al. | |
| 2004/0156546 A1 | 8/2004 | Kloth | |
| 2004/0170313 A1 | 9/2004 | Nakano et al. | |
| 2004/0186371 A1 | 9/2004 | Toda | |
| 2004/0217956 A1 | 11/2004 | Besl et al. | |
| 2004/0228515 A1 | 11/2004 | Okabe et al. | |
| 2004/0233036 A1 * | 11/2004 | Sefton | 340/5.53 |
| 2004/0252467 A1 | 12/2004 | Dobbs et al. | |
| 2004/0260895 A1 | 12/2004 | Werner et al. | |
| 2005/0013960 A1 | 1/2005 | Ozeki et al. | |
| 2005/0022038 A1 | 1/2005 | Kaushik et al. | |
| 2005/0044132 A1 | 2/2005 | Campbell et al. | |
| 2005/0063575 A1 | 3/2005 | Ma et al. | |
| 2005/0080928 A1 | 4/2005 | Beverly et al. | |
| 2005/0083338 A1 | 4/2005 | Yun et al. | |
| 2005/0084137 A1 | 4/2005 | Kim et al. | |
| 2005/0093990 A1 | 5/2005 | Aoyama | |
| 2005/0113960 A1 | 5/2005 | Karau et al. | |
| 2005/0126505 A1 | 6/2005 | Gallager et al. | |
| 2005/0219253 A1 | 10/2005 | Piazza et al. | |
| 2005/0259866 A1 | 11/2005 | Jacobs et al. | |
| 2005/0263678 A1 | 12/2005 | Arakawa | |
| 2006/0013473 A1 | 1/2006 | Woodfill et al. | |
| 2006/0047794 A1 | 3/2006 | Jezierski | |
| 2006/0117238 A1 | 6/2006 | DeVries et al. | |
| 2006/0135117 A1 | 6/2006 | Laumen et al. | |
| 2006/0149798 A1 | 7/2006 | Yamagami | |
| 2006/0171452 A1 | 8/2006 | Waehner | |
| 2006/0184296 A1 | 8/2006 | Voeller et al. | |
| 2006/0190627 A1 * | 8/2006 | Wu et al. | 709/249 |
| 2006/0235863 A1 | 10/2006 | Khan | |
| 2006/0239194 A1 | 10/2006 | Chapell | |
| 2006/0250514 A1 | 11/2006 | Inoue et al. | |
| 2006/0268357 A1 | 11/2006 | Vook et al. | |
| 2006/0269119 A1 | 11/2006 | Goldberg et al. | |
| 2006/0274971 A1 | 12/2006 | Kumazawa et al. | |
| 2006/0279750 A1 * | 12/2006 | Ha | 358/1.2 |
| 2007/0126744 A1 | 6/2007 | Tsutsumi | |
| 2007/0146491 A1 | 6/2007 | Tremblay et al. | |
| 2007/0159642 A1 | 7/2007 | Choi | |
| 2007/0229888 A1 | 10/2007 | Matsui | |
| 2007/0245097 A1 | 10/2007 | Gschwind et al. | |
| 2007/0250519 A1 | 10/2007 | Fineberg et al. | |
| 2008/0013862 A1 | 1/2008 | Isaka et al. | |
| 2008/0036780 A1 | 2/2008 | Liang et al. | |
| 2008/0063387 A1 | 3/2008 | Yahata et al. | |
| 2008/0092744 A1 | 4/2008 | Storbo et al. | |
| 2008/0129740 A1 | 6/2008 | Itagaki et al. | |
| 2008/0140771 A1 | 6/2008 | Vass et al. | |
| 2008/0144880 A1 | 6/2008 | DeLuca | |
| 2008/0147781 A1 | 6/2008 | Hopmann et al. | |
| 2008/0177964 A1 | 7/2008 | Takahashi et al. | |
| 2008/0259086 A1 | 10/2008 | Doi et al. | |
| 2008/0260297 A1 | 10/2008 | Chung et al. | |
| 2008/0263154 A1 | 10/2008 | Van Datta | |
| 2008/0270979 A1 | 10/2008 | McCool et al. | |
| 2009/0003542 A1 | 1/2009 | Ramanathan et al. | |
| 2009/0052542 A1 | 2/2009 | Romanovskiy et al. | |
| 2009/0066706 A1 | 3/2009 | Yasue et al. | |
| 2009/0074052 A1 | 3/2009 | Fukuhara et al. | |
| 2009/0083263 A1 | 3/2009 | Felch et al. | |
| 2009/0089462 A1 | 4/2009 | Strutt | |
| 2009/0150555 A1 | 6/2009 | Kim et al. | |
| 2009/0150556 A1 | 6/2009 | Kim et al. | |
| 2009/0187654 A1 | 7/2009 | Raja et al. | |
| 2009/0265396 A1 | 10/2009 | Ram et al. | |
| 2010/0060651 A1 | 3/2010 | Gala | |

FOREIGN PATENT DOCUMENTS

| | | |
|---|---|---|
| JP | 2007102794 A | 4/2007 |
| WO | 0068884 A1 | 4/2000 |
| WO | 0068884 | 11/2000 |

OTHER PUBLICATIONS

Kim et al., U.S. Appl. No. 11/951,709, Office Action Communication, May 14, 2010, 24 pages.
Kim et al., U.S. Appl. No. 11/940,506, Office Action Communication, May 14, 2010, 16 pages.
Chung et al., U.S. Appl. No. 11/738,711, Office Action Communication, Jun. 25, 2010, 26 pages.
Chung et al., U.S. Appl. No. 11/738,723, Office Action Communication, Jun. 24, 2010, 26 pages.
Kim et al., U.S. Appl. No. 11/951,712, Office Action Communication, Jul. 23, 2010, 25 pages.
Chambers, U.S. Appl. No. 11/951,709, Office Action Communication, Nov. 29, 2010, 21 pages.
Cosby, U.S. Appl. No. 11/940,470, Office Action Communication, Nov. 26, 2010, 19 pages.
Yang, U.S. Appl. No. 11/877,926, Office Action Communication, Nov. 22, 2010, 33 pages.
Tsai, U.S. Appl. No. 11/738,723, Office Action Communication, Nov. 17, 2010, 13 pages.
Tsai, U.S. Appl. No. 11/738,711, Office Action Communication, Nov. 9, 2010, 13 pages.
Ansari U.S. Appl. No. 11/940,506, Office Action Communication, Oct. 29, 2010, 21 pages.

Tiv, U.S. Appl. No. 11/951,712, Office Action Communication, Jan. 5, 2011, 18 pages.
Do, U.S. Appl. No. 11/668,875, Notice of Allowance & Fees Due, Aug. 13, 2010, 9 pages.
Do, U.S. Appl. No. 11/668,875, Notice of Allowance & Fees Due, Sep. 20, 2010, 8 pages.
Kuhnen, PCT / EP2008 / 050443, Invitation to Pay Additional Fees, Apr. 25, 2008, 6 pages.
Eveno, PCT / EP2008 / 050443, International Search Report, Jul. 22, 2008, 5 pages.
Cussac, PCT / EP2008 / 050443, PCT International Preliminary Report on Patentability, Aug. 4, 2009, 8 pages.
Tsung Yin Tsai, U.S. Appl. No. 11/738,711, Office Action Communication, Feb. 18, 2011, 17 pages.
Tsung Yin Tsai, U.S. Appl. No. 11/738,723, Office Action Communication, Feb. 18, 2011, 17 pages.
Cosby, Lawrence V., U.S. Appl. No. 11/940,470, Office Action Communication, Mar. 4, 2011, 22 pages.
Yang, Qian, U.S. Appl. No. 11/877,926, Office Action Communication, Mar. 23, 2011, 32 pages.
Bitar, Nancy, U.S. Appl. No. 11/782,170, Office Action Communication, Mar. 17, 2011, 19 pages.
Tiv, U.S. Appl. No. 11/951,712, Office Action Communication, Apr. 26, 2011, 20 pages.
Tsai, U.S. Appl. No. 11/738,723, Office Action Communication, May 23, 2011, 16 pages.
Tsai, U.S. Appl. No. 11/738,711, Office Action Communication, May 23, 2011, 16 pages.
Bitar, U.S. Appl. No. 11/782,170, Notice of Allowance and Fees Due, Feb. 21, 2012, 20 pages.
Chambers, U.S. Appl. No. 11/951,709, Office Action Communication, Mar. 21, 2012, 27 pages.
Entezari, U.S. Appl. No. 12/028,073, Notice of Allowance & Fees Due, Mar. 21, 2012, 18 pages.
Yang, U.S. Appl. No. 11/767,728, Office Action Communication, Oct. 28, 2011, 33 pages.
Tsai, U.S. Appl. No. 11/738,711, Office Action Communication, Nov. 4, 2011, 14 pages.
Entezari, U.S. Appl. No. 12/028,073, Office Action Communication, Dec. 2, 2011, 51 pages.
Tsai, U.S. Appl. No. 11/738,723, Office Action Communication, Nov. 4, 2011, 15 pages.
Chambers, U.S. Appl. No. 11/951,709, Office Action Communication, Dec. 20, 2011, 40 pages.
Cosby, U.S. Appl. No. 11/940,470, Office Action Communication, Dec. 22, 2011, 41 pages.
Yang, U.S. Appl. No. 11/877,926, Office Action Communication, Jan. 4, 2012, 40 pages.
Bitar, U.S. Appl. No. 11/782,170, Office Action Communication, Sep. 16, 2011, 21 pages.
Tsai, U.S. Appl. No. 11/738,711, Office Action Communication, Sep. 23, 2011, 20 pages.
Tsai, U.S. Appl. No. 11/738,723, Office Action Communication, Sep. 27, 2011, 20 pages.
Tiv, U.S. Appl. No. 11/951,712, Office Action Communication, Oct. 21, 2011, 27 pages.
Yang, U.S. Appl. No. 11/877,926, Office Action Communication, Apr. 27, 2012, 32 pages.
Tsai, U.S. Appl. No. 11/738,711, Notice of Allowance & Fees Due, May 25, 2012, 5 pages.
Tsai, U.S. Appl. No. 11/738,723, Notice of Allowance & Fees Due, May 25, 2012, 31 pages.
Kim, U.S. Appl. No. 12/057,942, Office Action Communication, Jun. 7, 2012, 58 pages.
Yang, U.S. Appl. No. 11/877,926, Office Action Communication, Aug. 10, 2012, 47 pages.
Patent Cooperation Treaty, International Application No. PCT/EP2008/054331, Filed Oct. 4, 2008, International Search Report and Written Opinion of the International Searching Authority, Jul. 28, 2008, 10 pages.
Kim et al., U.S. Appl. No. 11/940,506, Office Action Communication, Nov. 2, 2009, 20 pages.
Kim et al., U.S. Appl. No. 11/951,709, Office Action Communication, Nov. 17, 2009, 20 pages.
Kim et al., U.S. Appl. No. 11/951,712, Office Action Communication, Sep. 9, 2009, 26 pages.
Kim et al., U.S. Appl. No. 11/940,470, Office Action Communication, Nov. 18, 2009, 31 pages.
PCT Search Report, International Application No. PCT/EP2008/054331, Oct. 4, 2008, 10 pages.
Cosby, U.S. Appl. No. 11/940,470, Examiner's Answers, Nov. 16, 2012, 36 pages.
Chambers, U.S. Appl. No. 11/951,709, Examiners Answers, Nov. 23, 2012, 28 pages.
Yang, U.S. Appl. No. 11/877,926, Final Office Action, Nov. 30, 2012, 43 pages.
Japanese Patent Application No. 2008-0274140, Office Action Partial Translation, Mar. 26, 2013, 2 pages.
Masahiro, "Operating System SXO for Continuously Operable Sure System 2000 (1): An Overview, the 42nd National Convention of IPSJ", (the first-half period of 1991), Japan, Information Processing Society of Japan, Feb. 25, 1991, abstract, 4 pages.
Yang, U.S. Appl. No. 11/877,926, Office Action Communication, Mar. 1, 2013, 37 pages.
Patel, U.S. Appl. No. 12/057,942, Notice of Allowance & Fees Due, Oct. 10, 2012, 18 pages.

* cited by examiner

HYBRID IMAGE PROCESSING SYSTEM FOR A SINGLE FIELD OF VIEW HAVING A PLURALITY OF INSPECTION THREADS

CROSS-REFERENCE TO RELATED APPLICATION

This application is a continuation-in-part (CIP) application of commonly owned and co-pending patent application Ser. No. 11/738,723, entitled "HETEROGENEOUS IMAGE PROCESSING SYSTEM", filed Apr. 23, 2007, the entire contents of which are herein incorporated by reference. This application is also related in some aspects to commonly owned patent application Ser. No. 11/738,711, entitled "HETEROGENEOUS IMAGE PROCESSING SYSTEM", filed Apr. 23, 2007, the entire contents of which are herein incorporated by reference.

FIELD OF THE INVENTION

In general, the present invention relates to image processing/inspection. Specifically, the present invention relates to a hybrid image processing system that provides accelerated image processing as compared to previous approaches.

BACKGROUND OF THE INVENTION

Current image processing/inspection systems have limited processing power. Specifically, current systems perform all image processing functions within a single, general-purpose system. The processor used in current image processing/inspection systems is not powerful enough to handle the image processing demands, data rates, and algorithms for much of the current generation of systems (e.g., manufacturing inspection systems), let alone the next generation of systems. Next-generation manufacturing inspection systems have a need for a fast image processing system in order to complete image inspection within required times. As the size of the inspection area and the amount of gray scale data double, the data per one scan area increases dramatically. Therefore, the image inspection processing time is drastically increased. Thus, the current inspection system(s) will not adequately handle the requirements for future manufacturing systems.

Although, image processing functions are sometimes off-loaded to another system, this other system also uses a general purpose processor that fails to actually perform any image processing acceleration. In addition, image processing functions in current systems are tied to a specific processor and platform, making it difficult to offload and accelerate specific functions at a fine-grained level.

Whereas the development of a new inspection system will increase cost and development time, it is desirable to use reusable system components without impacting system performance. In view of the foregoing, there exists a need for an approach that solves at least one of the above-referenced deficiencies of the current art.

SUMMARY OF THE INVENTION

This invention relates to machine vision computing environments, and more specifically relates to a system and method for selectively accelerating the execution of image processing applications using a hybrid computing system. Under the present invention, a hybrid system is one that is multi-platform, and potentially distributed via a network or other connection. Provided herein is a machine vision system and method for executing image processing applications on a hybrid image processing system. Implementations of the invention provide a machine vision system and method for distributing and managing the execution of image processing applications at a fine-grained level via a switch-connected hybrid system. This method allows one system to be used to manage and control the system functions, and one or more other systems to execute image processing applications. The teachings herein also allow the management and control system components to be reused, and the image processing components to be used as an image processing accelerator or co-processor.

As such, the hybrid image processing system of the present invention generally includes an image interface unit and an image processing unit. The image interface unit will receive image data corresponding to a set (i.e., at least one) of images, generate commands for processing the image data, and send the images and the commands to an image processing unit (of the hybrid image processing system). Upon receipt, the image processing unit will recognize and interpret the commands, assign and/or schedule tasks for processing the image data to a set of (e.g., special) processing engines based on the commands, and return results and/or processed image data to the image interface unit.

A first aspect of the present invention provides a hybrid image processing system, comprising: an image interface unit being configured to receive image data from a set of image recordation mechanisms; and an image processing unit being configured to receive the image data from the image interface unit, process the image data, and send processed image data to the image interface unit.

A second aspect of the present invention provides a hybrid image processing system, comprising: an image interface unit for receiving image data, for sending the image data and commands for processing the image data, and for receiving processed image data, the image interface unit comprising a client application, an image grabber library, a first communications library, and an image processing command library; and an image processing unit for receiving the image data and the commands from the image interface unit, for processing the image data, and for returning processed image data to the image interface unit, the image processing unit comprising a command dispatcher, an image processing library, a software developer kit library, and a second communications library.

A third aspect of the present invention provides a method for processing images, comprising: receiving image data on an image interface unit from a set of image recordation mechanisms; sending the image data and commands for processing the image data to an image processing unit; processing the image data on the image processing unit based on the commands; and returning processed image data from the image processing unit to the image interface unit.

A fourth aspect of the present invention provides a method for processing images, comprising: receiving image data; generating commands for processing the image data using an image processing command library; interpreting the commands; assigning tasks to a set of processing engines to process the image data based on the commands; and processing the image data in response to the tasks.

A fifth aspect of the present invention provides a program product stored on at least one computer readable medium for processing images, the at least one computer readable medium comprising program code for causing at least one computer system to: receive image data from a set of image recordation mechanisms; generate commands for processing the image data; interpret the commands; assign tasks to a set of processing engines based on the commands to process the image data; and process the image data in response to the tasks.

A sixth aspect of the present invention provides a method for deploying a system for processing images, comprising: providing a computer infrastructure being operable to: receive image data from a set of image recordation mechanisms; generate commands for processing the image data; interpret the commands; assign tasks to a set of processing engines to process the image data based on the commands; and process the image data in response to the tasks.

A seventh aspect of the present invention provides computer software embodied in a propagated signal for processing images, the computer software comprising instructions for causing at least one computer system to: receive image data from a set of image recordation mechanisms; generate commands for processing the image data; interpret the commands; assign tasks to a set of processing engines based on the commands to process the image data; and process the image data in response to the tasks.

An eighth aspect of the present invention provides a data processing system for a system for processing images, comprising: a memory medium comprising instructions; a bus coupled to the memory medium; and a processor coupled to the bus that when executing the instructions causes the data processing system to: receive image data from a set of image recordation mechanisms, generate commands for processing the image data, interpret the commands, assign tasks to a set of processing engines based on the commands to process the image data, and process the image data in response to the tasks.

A ninth aspect of the present invention provides a computer-implemented business method for processing images, comprising: receiving image data; generating commands for processing the image data using an image processing command library; interpreting the commands; assigning tasks to a set of processing engines to process the image data based on the commands; and processing the image data in response to the tasks.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

This invention relates to machine vision computing environments, and more specifically relates to a system and method for selectively accelerating the execution of image processing applications using a hybrid computing system. Under the present invention, a hybrid system is one that is multi-platform, and potentially distributed via a network or other connection. Provided herein is a machine vision system and method for executing image processing applications on a hybrid image processing system. Implementations of the invention provide a machine vision system and method for distributing and managing the execution of image processing applications at a fine-grained level via a switch-connected hybrid system. This method allows one system to be used to manage and control the system functions, and one or more other systems to execute image processing applications. The teachings herein also allow the management and control system components to be reused, and the image processing components to be used as an image processing accelerator or co-processor.

As such, the hybrid image processing system of the present invention generally includes an image interface unit and an image processing unit. The image interface unit will receive image data corresponding to a set (i.e., at least one) of images, generate commands for processing the image data, and send the images and the commands to an image processing unit (of the hybrid image processing system). Upon receipt, the image processing unit will recognize and interpret the commands, assign and/or schedule tasks for processing the image data to a set of (e.g., special) processing engines based on the commands, and return results and/or processed image data to the image interface unit.

Figure 1:
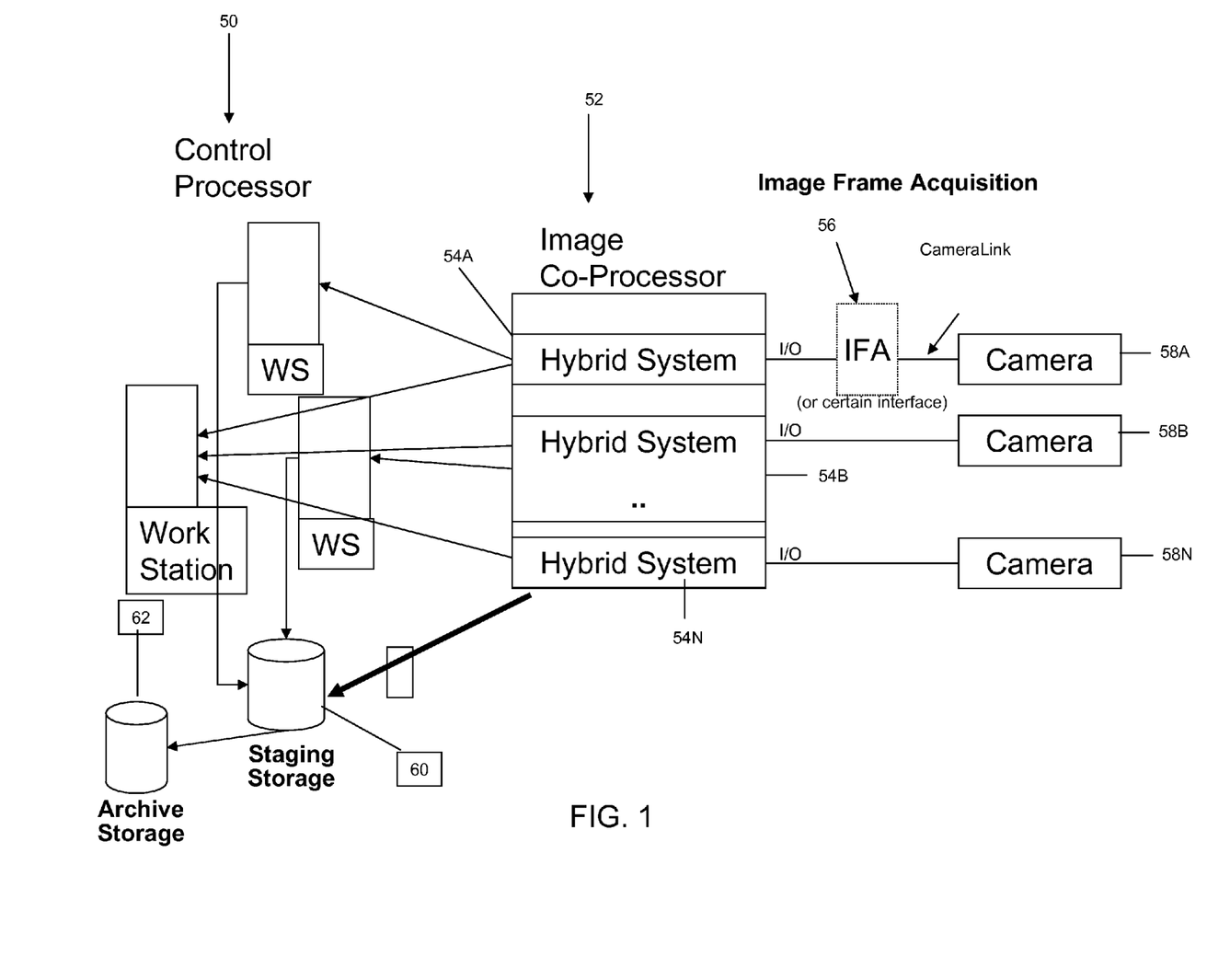
FIG. 1 shows a heterogeneous, hybrid image processing/inspection system according to the present invention.

Referring now to FIG. 1, a heterogeneous image processing/inspection system according to the present invention is shown. As depicted, image recordation mechanisms (e.g., cameras) 58A-N record images and are attached to an image co-processor 52 (via one more image frame acquisition mechanisms 56 for image processing). The image co-processor 52 in turn is connected to a control processor 50. These components are connected in a single, monolithic, tightly integrated system. All image processing is done completely within the single system. Each component can only be used with a limited set of other components. Each component, and thus the entire system, can only run a single operating system. The current image inspection system can be used in a manufacturing line to detect defects in items such as LCD panels or semiconductor wafers. The system performs one or more scans to detect defect points. Image analysis is conducted on a magnified version of each defect point. A single Field of View (FOV) has multiple inspection threads, which run different algorithms, potentially at the same time for different areas in an image. One algorithm may take significantly longer to run than others. Image processing software libraries are used to implement the algorithms. Large amounts of image and log data need to be moved, processed, and stored during inspection, requiring high I/O speeds and bandwidth.

This new design approach is a processing/inspection system based on hybrid, reusable components/systems 54A-N that are combined with special purpose engines/accelerators. Image processing applications use algorithms that often have specialized functions that can benefit from special purpose processors. These special purpose processors can be used as accelerators to speed up image processing algorithms in a fine-grained, selective fashion that takes advantage of the strengths of both general purpose and special purpose processors. Thus, the present invention, combines image recording mechanisms/devices 58A-N such as cameras with a special purpose processor for image processing as well as a general purpose processor 50 for determining control information.

In a typical embodiment, images are received by hybrid systems 54A-N of image co-processor 52, which process the images to determine image data. This image data (and optionally the images themselves) are then communicated to control processor 50 and staging storage unit 60. Control processor 50 then processes the image data to determine control information. The images, image data, and/or control information can then be stored in archive storage unit 62.

Figure 2:
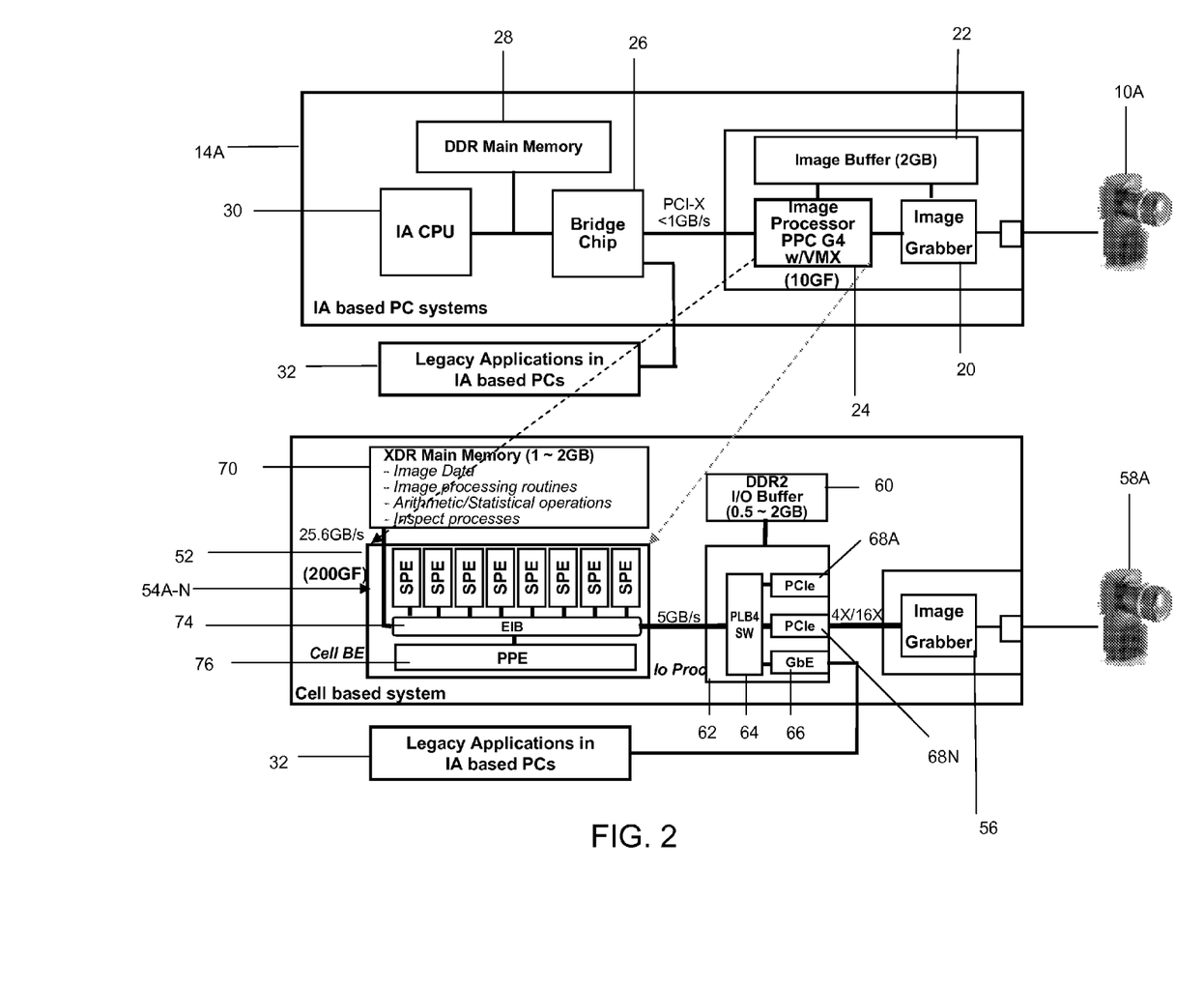
FIG. 2 shows a more detailed diagram of the system of FIG. 1 according to the present invention.

Referring now to FIG. 2, a more detailed diagram of the system of the present invention as well as its integration with an existing system is shown in greater detail. As depicted, image grabber 56 acquires images from one or more image recordation mechanisms 58A (which can be any type of camera now known or later developed such as a still image camera, video camera, etc.) and passes the image(s) to an input/output (I/O) processor 62. As further depicted, I/O processor 62 generally includes a set of express peripheral component interconnects (PCIs) 68A-N, a pure load balancer (PLB) 64 coupled to the set of express PCIs 68A-N; and a network interface 66 (e.g., GbE) coupled to the PLB 64 for interfacing with at least one legacy application 32 in IA-based PC 14A. An I/O buffer 60 is also shown coupled to the I/O processor 62.

Further shown within image co-processor 52 is a power processing element (PPE) 76, an element interconnect bus (EIB) 74 coupled to the PPE, and a set (e.g., one or more) but typically a plurality of special purpose engines (SPEs) 54A-N. SPEs 54A-N share the load involved with processing image(s) into image data. The division of work among SPEs 54A-N was not previously performed, and hence, previous systems are not suitable for current day and future image technology. As further shown, SPEs 54A-N feed image data, image processing routines, arithmetic/statistical operations, inspect processes, etc. to main memory 70 (which could be realized as staging storage unit 60 of FIG. 2.). Image co-processor 52 will leverage legacy application 32 in IA-based PC 14A to have general purpose or control processor 24 process the image or image data to determine control information.

As further depicted, IA-based PC system 14A of the related art obtains an image from image recordation mechanism 10A via image grabber 20, and passes the image to a general purpose image processor 24 for processing (e.g., utilizing image buffer 22). This sparsely processed image data is then passed to bridge chip 26, IA CPU 30, and (DDR) main memory 28. As can be seen, system 14A (of the related art) utilizes only a single general-purpose processor to process the image. Whereas, the system of the present invention (and of the above-incorporated patent applications) utilizes an image co-processor having a plurality of SPEs 54A-N as well as general purpose control processor 24 of IA-based PC system 14A. This is accomplished by communications through legacy application(s) 32 in IA-based PC system 14A. Thus, the present invention not only provides improved and accelerated image processing, but it does so by utilizing both existing and new infrastructure. It should be noted that the hybrid image processing system of the present invention is operable with multiple different computing platforms (e.g., Windows, Linux, etc.).

Figure 3:
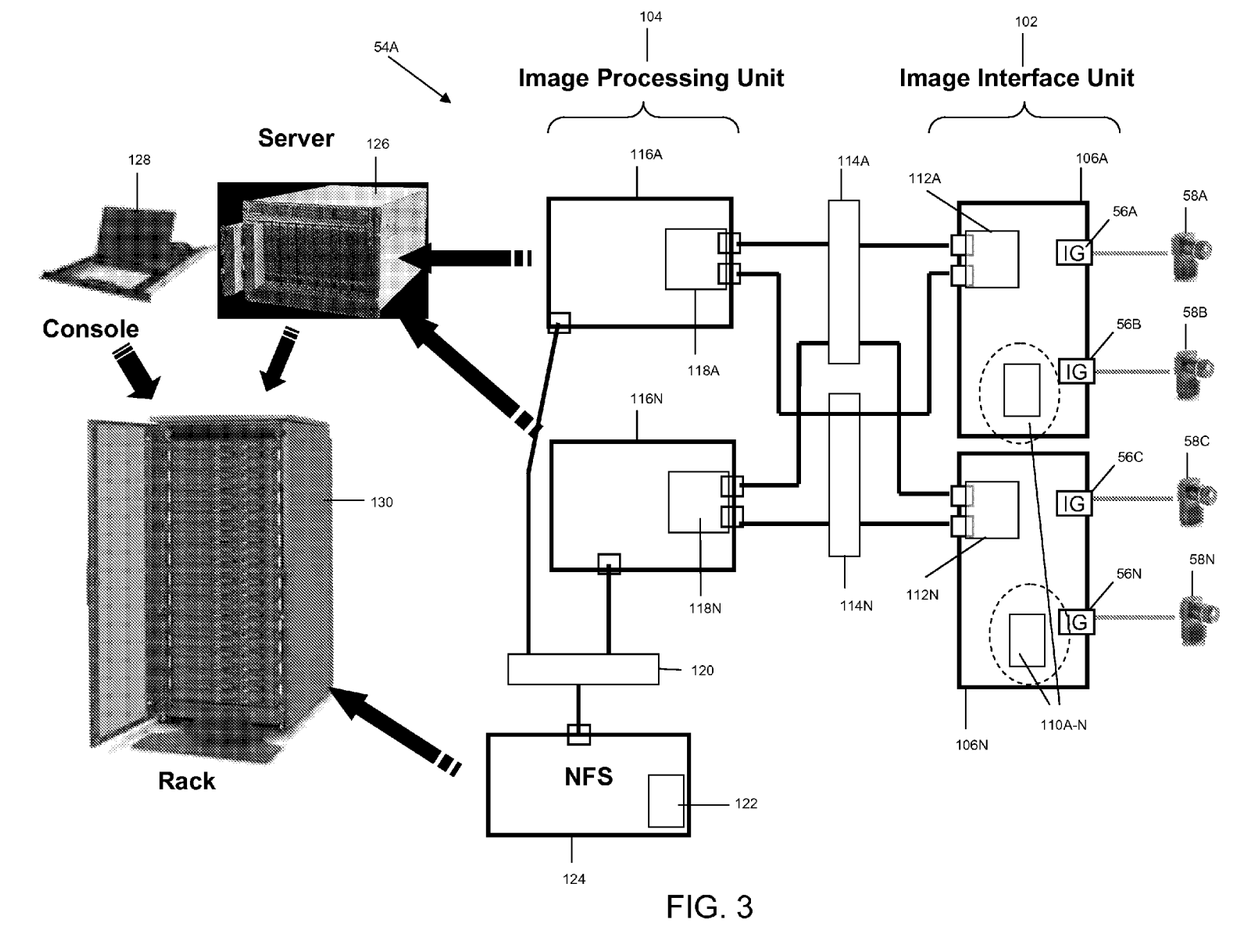
FIG. 3 shows a more detailed diagram of the hybrid-based co-processor of FIG. 1 according to the present invention.

Along these lines, this disclosure (as further described in FIGS. 3-7) provides a more specific implementation of hybrid systems 54A-N of image co-processor 52. Referring now to FIG. 3, a more detailed implementation of hybrid system 54A is shown. It should be appreciated that a single hybrid system 54A is shown for brevity purposes only and that other hybrid systems 54B-N could be similarly implemented. In any event, hybrid system 54A typically includes image interface unit 102 and image processing unit 104. Image interface unit 102 includes a set (at least one) of servers 106A-N that each have/communicate with a set of image grabbers 56A-N, a set of high density drives (HDDs) 110A-N, and a set of communications cards 112A-N. In an illustrative embodiment, set of servers 106A-N can be zSeries servers, xSeries servers or the like, but this need not be the case (zSeries and xSeries are trademarks of IBM Corp. in the United States and/or other countries). In addition, communications card 112A-N can be Infiniband card/boards, but this also need not be the case (Infiniband is a trademark of System I/O Inc., DBA Infiniband Trade Association in the United States and/or other countries). As further shown, image processing unit 104 includes a set of processors 116A-N (e.g., QS21 processors) that each have a communications card 118A-N (e.g., Infiniband). Interconnectivity between image interface unit 102 and image processing unit 104 is provided via a set of communications switches 114A-N (e.g., Infiniband). As further shown in FIG. 3, processors 116A-N communicate with a network file system server 124 (that includes an HDD 122) via a switch 120 such as a Gigabit Ethernet (GbE) switch. Further processors 116A-N and NFS server 124 can communicate with one or more other computing devices such as server 126, console 128, and/or rack 130.

As will be further described below, image grabbers 56A-N receive image data corresponding to a set of images from image recordation mechanisms 58A-N, upon receipt, image interface unit 102 will generate commands for processing the image data using an image processing command library. The commands and image data will then be sent to image processing unit 104 using sets of communications cards 112A-N and 118A-N through set of communications switches 114A-N. Upon receiving the image data and commands, image processing unit 104 will interpret the commands, and assign tasks to a set of processing engines (e.g., SPEs of FIG. 2) to process the image data based on the commands. Results (e.g., processed image data) will then be communicated back to image interface unit 102 via sets of communications cards 112A-N and 118A-N, and sets of communications switches 114A-N. Along these lines, image data, commands, processed image data and/or any other data types received or created under the present invention can be stored in HDDs 110A-N, HDD 124, NFS server 122, and/or other computing devices 126, 128, and 130. Communication of data to NFS server 122 occurs via GbE switch 120.

Figure 4:
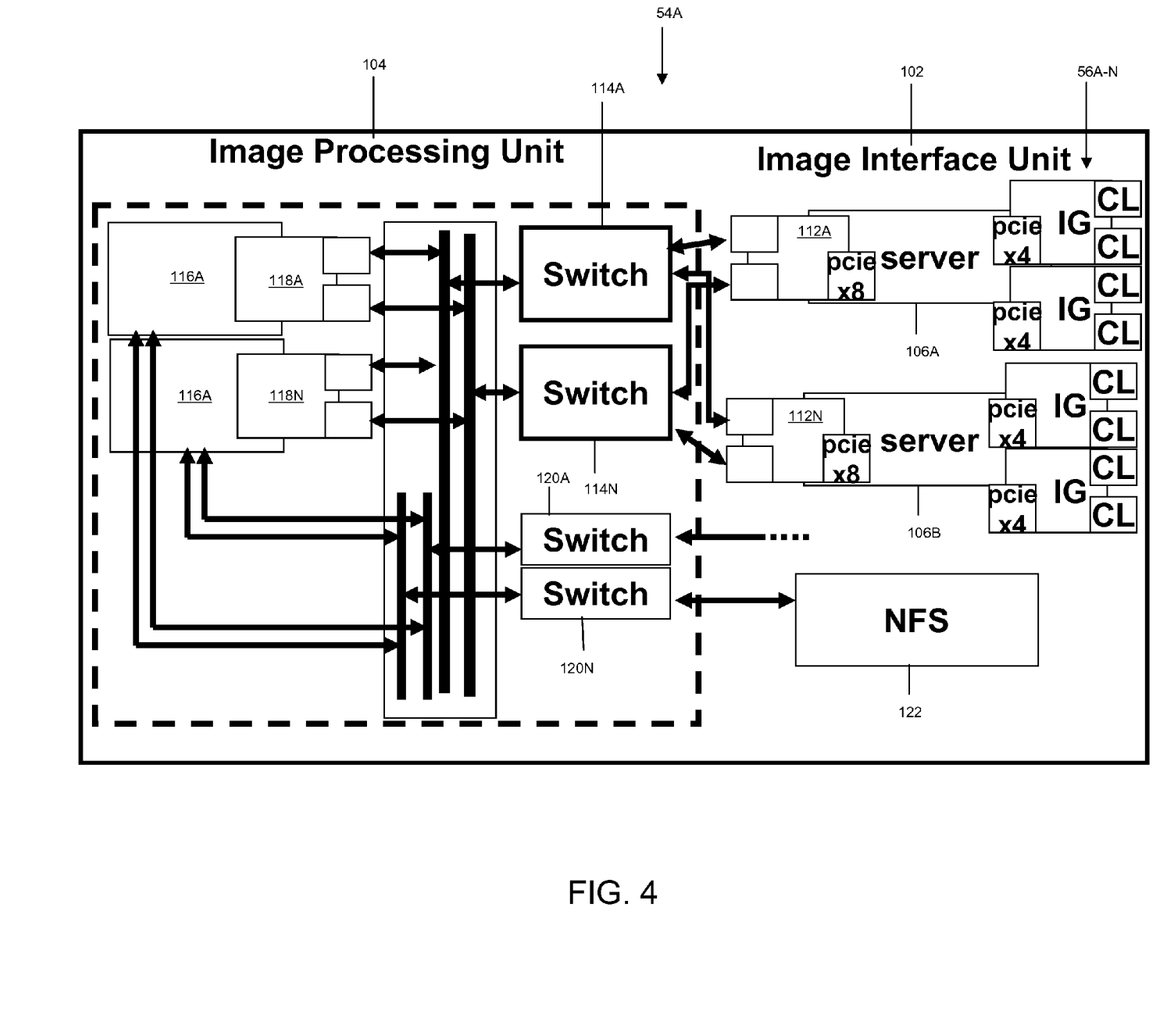
FIG. 4 shows a more specific implementation of the hybrid-based co-processor of FIG. 3 according to the present invention.

Referring now to FIG. 4, a more detailed architectural diagram of hybrid system 54A is shown. As depicted, image interface unit 102 includes set of servers 106A-N, set of image grabbers 56A-N, set of express PCIs, set of communications cards 112A-N, and set of CLs. Communication with processors 116A-N of image processing unit 104 occurs via set of communications switches 114A-N, and set of communication cards 118A-N. Further, communications with NFS server 122 occurs via set of GbE switches 120A-N.

Figure 5:
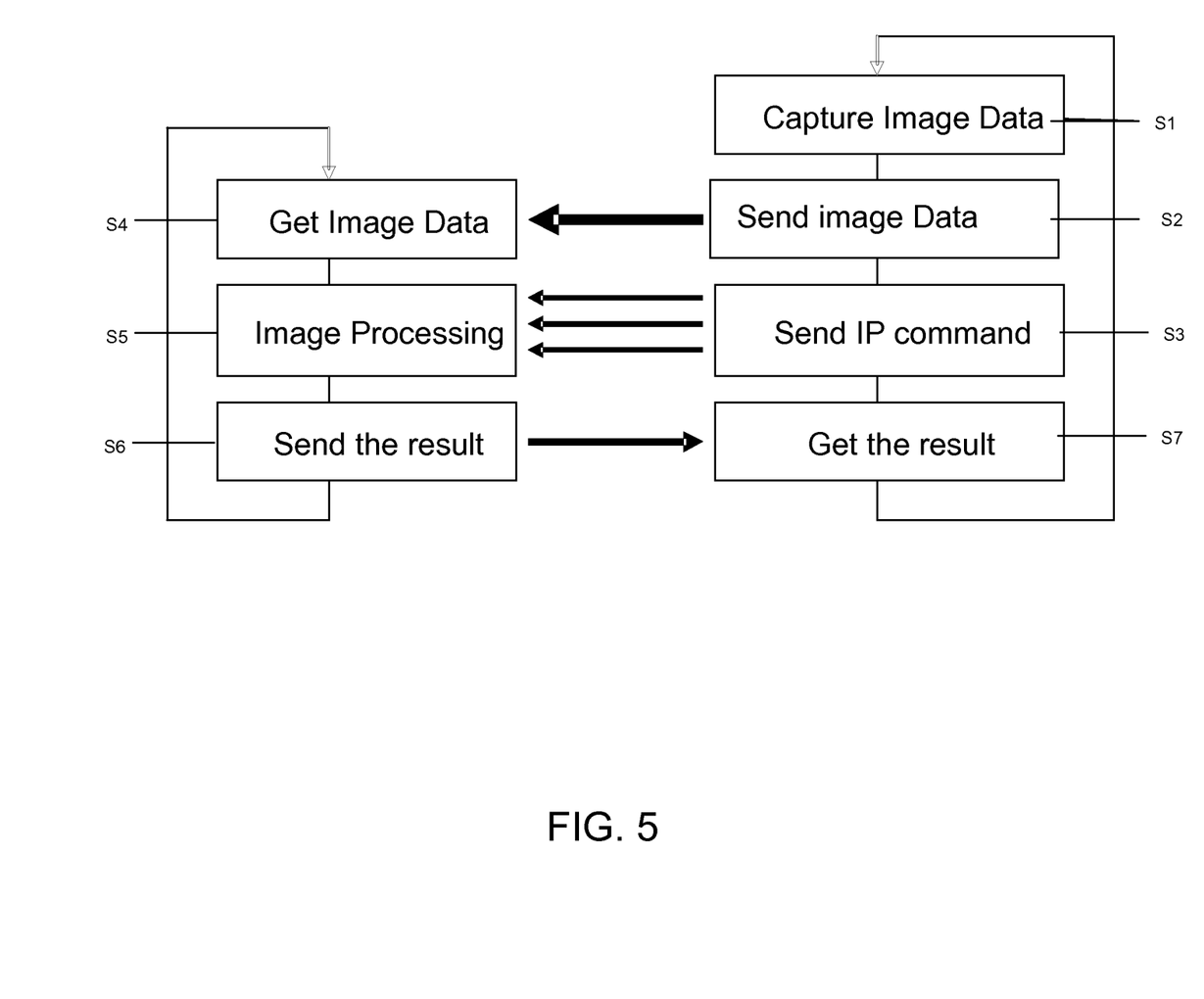
FIG. 5 shows a method flow diagram according to the present invention.
Figure 6:
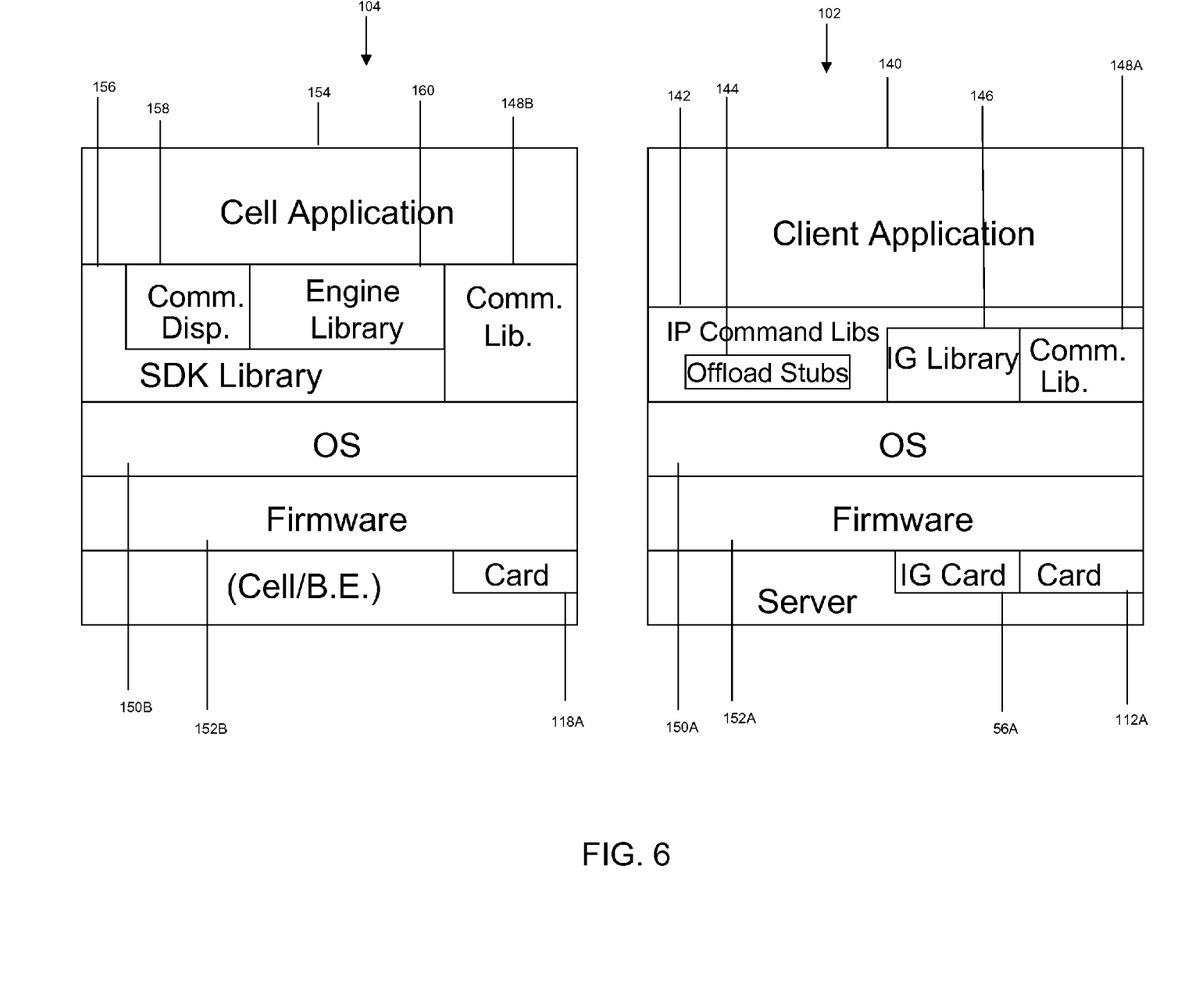
FIG. 6 depicts a software layer diagram according to the present invention.

Referring collectively to FIGS. 5 and 6, a method flow diagram describing the functions of hybrid systems 54A-N of the present invention is shown. FIG. 5 will be described in conjunction with FIG. 6, which is a software layer view of the present invention. In step S1, image data is received/captured by image interface unit 104 using client application 140, image grabber library 146, and communications library 148A. In step S2, the image data is sent to image processing unit 102 using communications libraries 148A-B (e.g., which are implemented using MPI—message passing interface) and communications cards 112A and 118A. In step S3, image processing commands are generated and sent by image interface unit 102 to image processing unit 104 using client application 140, image processing command library 142, offload stubs 144, communications libraries 148A-B and communications cards 112A and 118A. In one embodiment, IP command library 142 is used as a function call by client application 140.

Regardless, upon receiving the image data and commands in step S4, image processing unit 104 will acknowledge and interpret the commands, schedule/assign tasks for processing the image data to a set of processing engines (e.g., SPEs), and generate corresponding results. In general, these functions are performed via cell application 154, SDK library 156, command dispatcher 158, and processing engine library 160. In one embodiment, SDK library 156 means built-in functions prepared as a cell library (SPE Runtime library, SIMD mass library, etc). In addition, command dispatchers 158's function is to recognize commands sent from Intel server and distribute the tasks into SPEs or PPE itself. Processing engine (PPE/SPE) library 160 means an image processing library executed on PPE/SPE (PPE, SPE separately or using both PPE and SPE). In step 56, the results/processed image data are returned to image interface unit 102 via communications libraries 148A-B and communications cards 112A and 118A. As further shown in FIG. 6, image interface unit 102 and image processing unit 104 both include an operating system 150A-B and firmware 152A-B. Firmware 152A can be a BIOS for the server of image interface unit 102. Firmware 152B can be low level firmware and slim line open firmware developed (e.g., for QS in general).

It should be understood that the present invention could be deployed on one or more computing devices (e.g., servers, clients, etc.) within a computer infrastructure. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, the computer infrastructure is intended to demonstrate that some or all of the components of such an implementation could be deployed, managed, serviced, etc. by a service provider who offers to implement, deploy, and/or perform the functions of the present invention for others.

Where computer hardware is provided, it is understood that any computers utilized will include standard elements such as a processing unit, a memory medium, a bus, and input/output (I/O) interfaces. Further, such computer systems can be in communication with external I/O devices/resources. In general, processing units execute computer program code, such as the software (e.g., client application 140 and cell application 154) and functionality described above (e.g., all libraries discussed herein), which is stored within memory medium(s). While executing computer program code, the processing unit can read and/or write data to/from memory, I/O interfaces, etc. The bus provides a communication link between each of the components in a computer. External devices can comprise any device (e.g., keyboard, pointing device, display, etc.) that enable a user to interact with the computer system and/or any devices (e.g., network card, modem, etc.) that enable the computer to communicate with one or more other computing devices.

The hardware used to implement the present invention can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, the processing unit therein may comprise a single processing unit, or be distributed across one or more processing units in one or more locations, e.g., on a client and server. Similarly, the memory medium can comprise any combination of various types of data storage and/or transmission media that reside at one or more physical locations. Further, the I/O interfaces can comprise any system for exchanging information with one or more external device. Still further, it is understood that one or more additional components (e.g., system software, math co-processing unit, etc.) can be included in the hardware.

While shown and described herein as a hybrid image processing system and method, it is understood that the invention further provides various alternative embodiments. For example, in one embodiment, the invention provides a computer-readable/useable medium that includes computer program code to enable a computer infrastructure to process images. To this extent, the computer-readable/useable medium includes program code that implements the process(es) of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to process images. In this case, the service provider can create, maintain, support, etc., a computer infrastructure, such as computer infrastructure that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for processing images. In this case, a computer infrastructure can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A hybrid image processing system, comprising:
    an image interface unit being configured to:
        receive a plurality of images from a plurality of cameras for a single field of view of a same object and generate commands for processing of the images, wherein each image is at a same time and a different area of the same object; and
    an image processing unit being configured to:
        receive the plurality of images and the commands from the image interface unit,
        assign the commands to process the plurality of images, and
        distribute the processing of the plurality of images among a plurality of special purpose processing engines (SPEs), wherein the plurality of special purpose processing engines configured to:
            receive an off-load of at least one library function at a run time, wherein the at least one library function is written for the plurality of SPEs, wherein the at least one library function supports the processing of the plurality of images, and wherein the at least one library function is one of a plurality of algorithms, an optimization for a processor architecture, and a wrapper for a scripting language,
            process the plurality of images based on the commands, wherein the single field of view has a plurality of inspection threads, and wherein each inspection thread runs an algorithm that is different from the algorithm of any other inspection thread, and
            send the processed plurality of images to the image interface unit.

2. The hybrid image processing system of claim 1, the image interface unit being further configured to generate the commands based upon an image processing command library and send the commands to the image processing unit to distribute image processing tasks among the plurality of processing engines.

3. The hybrid image processing system of claim 1, the image interface unit and the image processing unit being coupled via a communications switch.

4. The hybrid image processing system of claim 1, the image interface unit comprising a set of servers, each of the set of servers comprising:
    a set of image grabbers being configured to receive image data from the plurality of cameras;
    a set of communications cards; and
    a set of high density drives (HDDs) for storing the plurality of images collected from the plurality of cameras.

5. The hybrid image processing system of claim 4, the image processing unit comprising a set of processors, each of the set of processors comprising a communications card.

6. The hybrid image processing system of claim 5, further comprising:
    a Gigabit Ethernet (GbE) switch coupled to the image processing unit; and
    a network file system coupled to the GbE switch.

7. The hybrid image processing system of claim 6, the network file system comprising a server having a HDD.

8. The hybrid image processing system of claim 1, the image interface unit and the image processing unit being embodied within an image co-processor, the image co-processor communicating with a control processor.

9. A hybrid image processing system, comprising:
    an image interface unit configured for:
        receiving a plurality of images for a single field of view of a same object, wherein each image is at a same time and a different area of the same object,
        generating commands for processing of the plurality of images,
        sending the plurality of images and the commands for processing the plurality of images, and
        receiving processed plurality of images, the image interface unit comprising a client application, an image grabber library, a first communications library, and an image processing command library; and
    an image processing unit configured for:
        receiving the plurality of images and the commands from the image interface unit,
        distributing the plurality of images among a plurality of special purpose processing engines (SPEs) based on the commands,
        receiving an off-load of at least one library function at a run time, wherein the at least one library function is written for the plurality of SPEs, wherein the at least one library function supports the processing of the plurality of images, and wherein the at least one library function is one of a plurality of algorithms, an optimization for a processor architecture, and a wrapper for a scripting language, assigning the commands to process the plurality of images to the plurality of special purpose, processing the plurality of images based on the commands, wherein the single field of view has a plurality of inspection threads, and wherein each inspection thread runs an algorithm that is different from the algorithm of any other inspection thread, and sending the processed plurality of images to the image interface unit, the image processing unit comprising a cell application, a command dispatcher, an image processing library, a software developer kit library, and a second communications library.

10. The hybrid image processing system of claim 9, the cell application processing the plurality of images based on the commands received from the client application, commands being generated using the image processing command library.

11. The hybrid image processing system of claim 9, the image interface unit further comprising:
   a set of offload stubs;
   a communications card, the set of offload stubs and the communications card being used by the client application to send the plurality of images to the cell application and to receive the processed plurality of images from the cell application; and
   an image grabber card, the image grabber card being used by the client application to receive the plurality of images from a plurality of cameras.

12. The hybrid image processing system of claim 9, the command dispatcher recognizing the commands, and distributing tasks for processing the plurality of images to the plurality of special purpose processing engines.

13. The hybrid image processing system of claim 9, the commands and plurality of images being sent from the client application to the cell application using the first communication library, the second communications library and a set of communications cards.

14. The hybrid image processing system of claim 9, the image interface unit and the image processing unit each further comprising an operating system, firmware and a processor.

15. The system of claim 9, the image interface unit and the image processing unit being implemented as a co-processor.

16. A method for processing images, comprising:
   receiving a plurality of images on an image interface unit from a plurality of cameras for a single field of view of a same object, wherein each image is at a same time and a different area of the same object;
   generating commands for processing of the plurality of images;
   sending the plurality of images and the commands for processing the plurality of images;
   receiving the plurality of images and commands on an image processing unit;
   assigning the commands to process the plurality of images;
   distributing the processing the plurality of images based on the commands among a plurality of special purpose processing engines (SPEs);
   receiving an off-load of at least one library function at a run time, wherein the at least one library function is written for the plurality of SPEs, wherein the at least one library function supports the processing of the plurality of images, and wherein the at least one library function is one of a plurality of algorithms, an optimization for a processor architecture, and a wrapper for a scripting language,
   processing the plurality of images on the image processing unit based on the commands, wherein the single field of view has a plurality of inspection threads, and wherein each inspection thread runs an algorithm that is different from the algorithm of any other inspection thread; and
   sending the processed plurality of images from the image processing unit to the image interface unit.

17. The method of claim 16, further comprising generating the commands on the image interface unit using an image processing command library.

18. The method of claim 16, further comprising:
   interpreting the commands on the image processing unit; and
   scheduling tasks for processing the plurality of images on the image processing unit.

19. The method of claim 16, the sending and the returning occurring via communication libraries accessed by the image interface unit and the image processing unit.

20. The method of claim 16, the receiving occurring via a set of image grabbers of the image interface unit.

21. A method for processing images, comprising:
   receiving a plurality of images on an image interface unit for a single field of view of a same object, wherein each image is at a same time and a different area of the same object;
   generating commands using an image processing command library for the processing of the plurality of images;
   interpreting the commands on an image processing unit;
   assigning tasks to and distributing tasks among a plurality of special purpose processing engines (SPEs) to process the plurality of images based on the commands;
   receiving an off-load of at least one library function at a run time, wherein the at least one library function is written for the plurality of SPEs, wherein the at least one library function supports the processing of the plurality of images, and wherein the at least one library function is one of a plurality of algorithms, an optimization for a processor architecture, and a wrapper for a scripting language; and
   processing the plurality of images in response to the tasks, wherein the single field of view has a plurality of inspection threads, and wherein each inspection thread runs an algorithm that is different from the algorithm of any other inspection thread.

22. A program product stored on at least one non-transitory computer readable medium for processing images, the at least one non-transitory computer readable medium comprising program code for causing at least one computer system to:
   receive a plurality of images from a plurality of cameras for a single field of view of a same object, wherein each image is at a same time and a different area of the same object;
   generate commands for processing of the plurality of images;
   interpret the commands;
   assign tasks to and distribute tasks among a plurality of special purpose processing engines (SPEs) based on the commands to process the plurality of images;
   receive an off-load of at least one library function at a run time, wherein the at least one library function is written for the plurality of SPEs, wherein the at least one library function supports the processing of the plurality of images, and wherein the at least one library function is one of a plurality of algorithms, an optimization for a processor architecture, and a wrapper for a scripting language; and process the plurality of images in response to the tasks, wherein the single field of view has a plurality of inspection threads, and wherein each inspection thread runs an algorithm that is different from the algorithm of any other inspection thread.

23. The program product of claim 22, the at least one non-transitory computer readable medium further comprising program code for causing at least one computer system to send processed plurality of images.

24. The program product of claim 22, the commands being generated using an image processing command library.

25. The program product of claim 22, the plurality of images being received by a set of image grabbers.

26. A method for deploying a system for processing images, comprising:
   providing a computer infrastructure being operable to:
      receive a plurality of images from a plurality of cameras for a single field of view of a same object, wherein each image is at a same time and a different area of the same object;
      generate commands for processing of the plurality of images;
      interpret the commands;
      assign tasks to and distribute tasks among a plurality of special purpose processing engines (SPEs) based on the commands to process the plurality of images;
      receive an off-load of at least one library function at a run time, wherein the at least one library function is written for the plurality of SPEs, wherein the at least one library function supports the processing of the plurality of images, and wherein the at least one library function is one of a plurality of algorithms, an optimization for a processor architecture, and a wrapper for a scripting language; and
      process the plurality of images in response to the tasks, wherein the single field of view has a plurality of inspection threads, and wherein each inspection thread runs an algorithm that is different from the algorithm of any other inspection thread.

* * * * *